United States Patent [19]

Adams

[11] 4,170,618

[45] Oct. 9, 1979

[54] DECORATIVE CONTAINER AND METHOD OF MANUFACTURE

[76] Inventor: Randolph P. Adams, 738 W. Canterbury, St. Louis, Mo. 63132

[21] Appl. No.: 783,147

[22] Filed: Mar. 31, 1977

[51] Int. Cl.$^2$ ............................................. B29C 17/02
[52] U.S. Cl. ...................................... 264/101; 47/58; 47/66; 47/72; 264/554; 264/132; 264/292
[58] Field of Search .................. 47/66, 67, 68, 69, 70, 47/71, 72, 73, 74; 425/174.4, 388; 264/92, 101, 292, 132, 102, 129

[56] References Cited

U.S. PATENT DOCUMENTS

| D. 161,026 | 11/1950 | Hollander | 47/66 X |
|---|---|---|---|
| D. 237,333 | 10/1975 | Knowles | 47/67 |
| D. 239,192 | 3/1976 | Wiles | 47/67 X |
| 995,510 | 6/1911 | Witt | 264/101 X |
| 2,355,559 | 8/1944 | Renner | 47/72 X |
| 3,080,680 | 3/1963 | Reynolds et al. | 47/74 |
| 3,084,389 | 4/1963 | Doyle | 425/388 |

FOREIGN PATENT DOCUMENTS 2036163  12/1970  France ........................... 47/67

OTHER PUBLICATIONS

McTier, Robert F., 1962 "Distortion Printing and Vacuum Forming of Thermoplastic Sheet" *SPE Journal*, Jul. 1962, pp. 741–745.

*Primary Examiner*—Paul T. Sewell
*Assistant Examiner*—James R. Feyrer
*Attorney, Agent, or Firm*—Paul M. Denk

[57] ABSTRACT

A decorative container useful for holding a flower pot or the like, and formed by the method of arranging a sheet of thermoplastic polymer upon a form, the form having a shape generally desired for the sheet after it has been molded into the configuration of the form, with said sheet and form being positioned within a heater, with the temperature within the heater being warmed to an elevated degree, and then maintaining the form held sheet within this heated environment for that time necessary for the sheet to soften and fold under the influence of heat into its decorative container configuration, and thereafter removing the heat formed sheet from the heater and cooling it to an ambient temperature.

1 Claim, 4 Drawing Figures

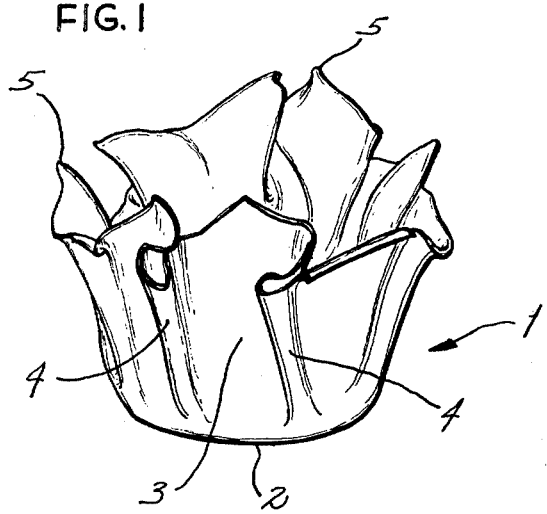
FIG. 1
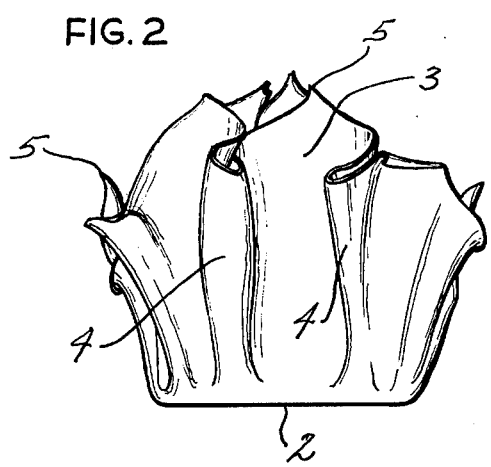
FIG. 2
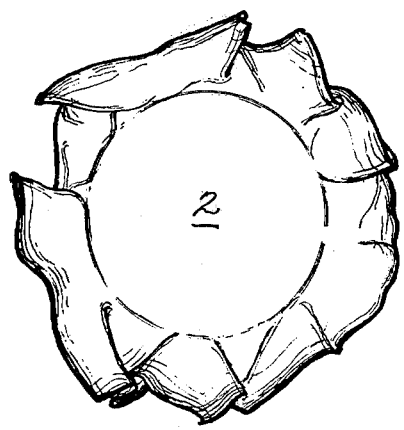
FIG. 3
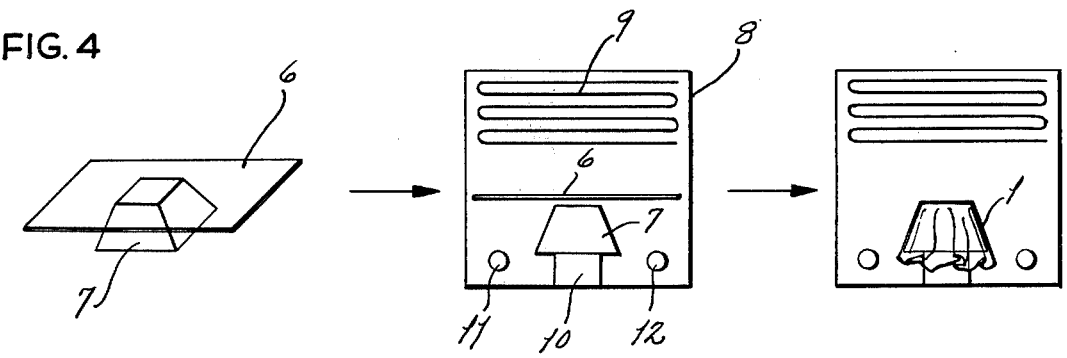
FIG. 4
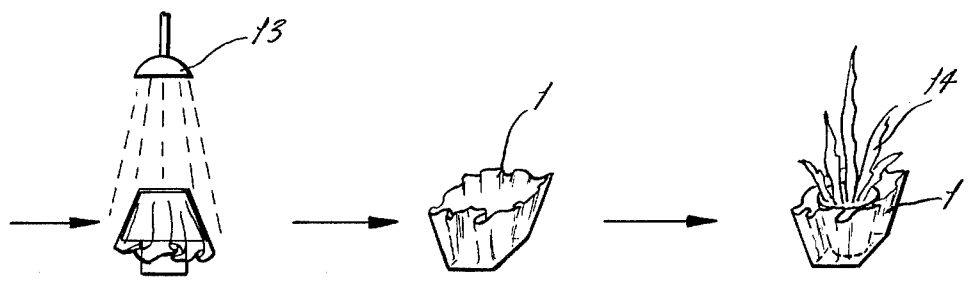

DECORATIVE CONTAINER AND METHOD OF MANUFACTURE

BACKGROUND OF THE INVENTION

This invention relates generally to a container, and more particularly pertains to a decorative form of container that is useful for supporting a flower laden pot, as for domestic or commercial exhibit.

Generally in the use of various types of horticultural utensils, some form of drainage dish or the like is utilized for supporting a flower pot, and as generally known, such flower pots include an aperture in its lower segment so that as their contained plants are watered, the runoff water is allowed to drain from the potted plant. Usually, for lack of a better instrument, the home owner will utilize one of the every day china for supporting the potted plant off of a window sill, shelf, or other surface, and the plant normally cannot be watered to any significant degree since such a supportive means does not have sufficient depth for collecting the drainage after a watering. Hence, repeated waterings, almost daily or bi-daily are required to sustain plant growth and prevent the onset of dying plants due to lack of moisture.

Usually with the prior art type of clay, ceramic, plastic, or other forms of flower pots, the supportive dish or other bowl is maintained to a low profile so that the appearance of the pot itself may be readily observed. But, as anyone knows, a red clay tile flower pot is not that pleasing esthetically, and therefore, this invention is designed to further enhance the beauty of the growing plant, by providing a general moisture collecting container in which the flower pot itself may be located, but in addition, furnish an outer covering to the flower pot that is complemental of the type of plant being grown and provide an enhancement of the flowering bloom anticipated.

In view of the foregoing, it is the principal object of this invention to provide a decorative container for supporting a potted plant and which generally augments and enhances the appearance of the entire setting, and in addition, adds the utilitarian feature of providing a means for collection of moisture draining from the watered plant.

Another object of this invention is to provide a decorative container for a plant that is formed incorporating a series of undulating folds that structurally reinforce the side walls of the container, and which integrally incorporates a flattened base furnishing total support for any potted plant located therein.

A further object of this invention is to provide a method for forming a decorative container from a sheet of thermoplastic material simply through exposure of the form held sheet to a temperature for a segment of time.

Another object of this invention is to provide an inexpensive manner for forming a decorative container for a potted plant or the like.

These and other objects will become more apparent to those skilled in the art upon reviewing the summary of this invention, and upon undertaking a study of its preferred embodiment in view of the drawing.

SUMMARY OF THE INVENTION

This invention contemplates the formation of a decorative container for use in holding a variety of articles or paraphernalia, but in particular fines specific utility for supporting a potted flower or plant, especially for domestic or commercial usage. The container is generally formed from a sheet of thermoplastic material, generally cut to those dimensions significant to provide for the draped formation of the sheet material over a form during the molding process. Such material is generally formed of a plastic, being thermoplastic in consistency, so that when exposed to some degree of heat, the plastic sheet softens, without melting, and commences to fold under its own weight into an approximate or close formation with its supportive form, thereby generally undertaking the configuration of the form in preparation for setting.

Plastic materials that have been found to have the desired thermoplastic attributes are the various vinyls or acetates that are available in the trade. Generally, these types of compositions can be acquired in the form of a film, and either having transparency, or can be treated during the film construction with a colorant so as to add any pleasing color to the formed film, and hence achieving a decorative container when constructed in according to the process of this invention. In the practice of this invention, films in the vicinity of 0.005 to 0.050 inches have been found very satisfactory for use in the formation of this designed container, although similar films of either greater thickness, or even less, can be used in the formation of these containers, and yet provide the attributes desired during their usage. Although, in the models of this invention thus far formed, a vinyl film material having a thickness of approximately 0.010 inches has been highly satisfactory in use, since such film has an inherent rigidity, in its film stage, so that when it is rested upon its form, it maintains a planar sheet disposition, but then when exposed to heat, does exhibit thermoplastic characteristics and casually folds downwardly about its form, providing a rather inherent undulating appearance of repeated folds around its side wall periphery, that when the molded film has achieved its intended formation, and is removed from its exposure to heat, it sets into that folded shape and maintains it permanently, unless it should be once again subjected to the same degree of heat, which is very unlikely.

Various other types of thermoplastic materials are also useful for forming the decorative container of this invention. Such materials in the category of an acrylic, a cellulose acetate, a vinyl acetate, polyester, polyethylene, polyvinyl alcohol, vinyl chloride, polyproplyene, and urethane film of the thickness as generally previously explained, can be used for the purposes of this invention for forming the designed container. Significantly, all the containers formed of these materials will be water tight and not leak.

The form used for supporting the sheet material just prior to its insertion within the heater or oven is selected having that shape eventually desired for the container being constructed. For example, such a form may be shaped as a frustrum, and may be either of pyramidal configuration, of a cone shape, or of any other polygonal design, but preferably will have a base portion that is flattened, due to the inherent shape of a frustrum, so that the flattened portion, when formed into the thermoplastic container, will furnish the stable base for such formed container when it is removed from the heater, cooled, and inverted for immediate usage.

In addition, the decorative container of this invention, since it is formed from a sheet material, having a planar configuration, may have imprinted upon it some additional design, either by the silk screen process, or by other printing methods, so that after the plastic sheet is exposed to the method of this invention, and undertakes its potted configuration, the previous decoration will yet further enhance the overall appearance of the container. But, since the container does have a series of folds, generally arranged angularly upwardly, any imprinted decal as previously applied to the blank, in the formed container, leaves the impression of puzzlement as to just how such a decal or imprinting could have been applied to such a fold laden side wall in the first instance for this style of container. Hence, it can be readily seen that the method of this invention is very useful for providing an end product that may function highly satisfactory as a decorative container, but yet the decorative procedure utilized during the formation of this invention is a very fascile step, since the container is originally formed from a flattened or planar sheet of the material that has been precut to the dimensions desired.

BRIEF DESCRIPTION OF THE DRAWING

In the drawing,

FIG. 1 provides a perspective view of one of the formed decorative containers of this invention;

FIG. 2 provides a side elevational view of the container of FIG. 1;

FIG. 3 furnishes a top plan view of the container of FIG. 1;

FIG. 4 furnishes a schematic step diagram showing the sequence of procedures utilized in the performance of the method of this invention in forming the previously disclosed decorative container.

DESCRIPTION OF THE PREFERRED EMBODIMENT

In referring to the drawing, and in particular FIGS. 1 through 3, there is disclosed the decorative container 1 of this invention which is formed having a base portion 2 and a continuous upwardly angulated side wall 3 around its periphery, being integrally formed extending from the said base 2. As can be seen, in the formation of this container, the side walls 3 includes a series of random folds, as depicted at 4, and these are naturally produced during the formation of the container by the method of this invention. In addition, a series of upwardly disposed points, as at 5, are naturally formed into the configuration of the container due to the fact that it is molded from a single sheet of the flat thermoplastic material in its inception.

In the formation of the container of this invention, the form used for molding of the thermoplastic material, when heated, dictates the shape of the acquired container. As can be seen in FIG. 3, the base 2 of the container is of circular formation, and therefore, the form used was also of the circular design. In addition, since the side walls 3 of the container are generally angularly disposed upwardly, and slightly inclined outwardly, the form (not shown) would be of a frustrum design, as that of a cone, so that as the sheet of material is softened for folding downwardly upon the inverted frustrum, it generally undertakes the particular shape as shown for the container in FIGS. 1 through 3 of this drawing.

As can be seen in FIG. 4, a schematic view of the steps utilized in the procedure for forming the decorative container of this invention is set forth. As shown, a sheet of the thermoplastic material, as at 6, is arranged upon the top surface of a form 7. In this particular instance, the form comprises a frustrum for a pyramid, so that the finished container will generally have a similar appearance to that of a form when molded.

And, while a rectangular or square sheet 6 of the thermoplastic material is shown, obviously the outer periphery of the sheet may be cut to any design desired, such as circular, to a polygonal shape, or any other serrated design as one may desire for the upper edge of the finished product. But, after the sheet material 6 is placed upon its form 7, it is then transferred into a heater, as in the nature of the oven 8, and therein be exposed to the heat emanating from its electrical element 9. Preferably, the heat generated within the heater, for the particular type of thermoplastic materials previously identified, is in the range of 150° to 350° F. At these temperatures, a sheet of thermoplastic material, such as one which may be approximately 0.010 inches in thickness, takes approximately five to ten minutes to soften and fold downwardly upon its form 7, which in this instance, is shown resting upon a support 10. And, just for schematic purposes, the heater 8 of this invention may include a control knob, as at 11, for regulating the degrees of heat attained by the heater element 9. It is further likely, and within the scope of this invention, that for mass production purposes, in the forming of the container of this invention, the amount of time necessary to heat and form the thermoplastic material might desirably be lessened. Hence, and as can be seen in this FIG. 4, the knob 12 may be used for controlling a vacuum pump (not shown), which may communicate with the interior of the heater 8, and evacuate the atmosphere within the said heater, either to a partial vacuum, or perhaps down to an approximate absolute vacuum, so that a lesser amount of heat and time will be required to perform the heat shaping step of this invention. Perhaps only a few seconds of time will be necessary to attain a heat shaping of the thermoplastic material at the degrees above specified when the heater will have some or all of its atmosphere evacuated.

In the next sequence step shown in FIG. 4 of the drawing, the heat, over a period of time, leads to a plasticity of the thermoplastic sheet material, and the sheet material folds downwardly under the influence of its own weight, as through gravity attraction, into the configuration of its supporting form. At this stage, the container has undertaken generally an inverted shape of the type of finished decorative container 1 as previously analyzed, and hence, both the heat and vacuum pressure may be eliminated, and the form supported container 1 removed from the said heater. In the next step of this invention, the formed container may be exposed to a cooling agent, such as by leaving it sit for a period of time within ambient air to allow for the return of the thermoplastic material to a normal temperature, or the cooling may be accelerated by exposing the formed container to a shower of water, or other coolant, as can be seen at 13. Then, after cooling, the formed container 1 is removed from its form, inverted, and is now ready for the insertion of a potted plant, as at 14, to be used for the purposes of this invention as previously summarized and analyzed.

As can be seen in the final step of FIG. 4, the decorative container 1 of this invention provides either a partial or full covering for the clay pot 14 thereby providing a colored or other generally pleasing appearing container that surrounds the pot and augments the appearance of the plant itself, which extends upwardly therefrom. In addition, the decorative container 1 is useful for collecting any drainage from the potted plant, after it is watered, and retains said water at its lower regions so that it may once again be absorbed back into the plant soil to provide for a sustained and continuous exposure of the plant to some degree of moisture. Hence, healthy plants may also be attained and maintained through the use of the formed product analyzed in this invention.

Various modifications to the invention as explained herein may occur to those skilled in the art upon reviewing the subject matter of this disclosure. Any such variations, if within the scope of this invention, and encompassed by the claims appended hereto, are intended to be protected by any United States patent issuing hereon. The description of the preferred embodiment is set forth for illustrative purposes only, and is not meant to be limiting of the alternative steps of the procedure for forming this decorative container, nor the various shapes that may be given to it depending upon the type of form utilized in such process.

Having thus described the invention what is claimed and desired to be secured by Letters Patent is:

1. The method for forming a decorative container for a flower pot or other paraphernalia including providing a sheet of thermoplastic polymer material, imprinting a design or other matter upon the sheet of polymer, arranging said imprinted sheet upon a form of desired shape, cutting said sheet to the dimensions approximating the dimensions of the base and side walls of the intended container, locating said form held sheet within a heater, reducing the atmospheric pressure within the heater before elevating its temperature, elevating the temperature within the heater to a range of between about 250° to 350° F., maintaining said form held sheet within the heated environment of the heater for a time of between about one to ten minutes and until said sheet folds under the influence of the heat complementary about its form, and then removing said sheet from the heater and cooling it by exposing it to a spray of cool water until it reaches an ambient temperature.

* * * * *